(12) United States Patent
Zahr et al.

(10) Patent No.: US 9,745,107 B2
(45) Date of Patent: Aug. 29, 2017

(54) E-LIQUID DISPENSER

(71) Applicant: RETRO BRANDS, LLC, Foothill Ranch, CA (US)

(72) Inventors: Rabih Zahr, Foothill Ranch, CA (US); Shady Makarem, Foothill Ranch, CA (US); Nedal Makarem, Foothill Ranch, CA (US)

(73) Assignee: RETRO BRANDS, LLC, Foothill Ranch, CA (US)

(*) Notice: Subject to any disclaimer, the term of this patent is extended or adjusted under 35 U.S.C. 154(b) by 0 days.

(21) Appl. No.: 15/052,501

(22) Filed: Feb. 24, 2016

(65) Prior Publication Data
US 2016/0167846 A1   Jun. 16, 2016

Related U.S. Application Data

(63) Continuation-in-part of application No. 14/785,246, filed as application No. PCT/US2014/070117 on Dec.
(Continued)

(51) Int. Cl.
*B67B 1/00* (2006.01)
*B65D 43/16* (2006.01)
(Continued)

(52) U.S. Cl.
CPC .......... *B65D 43/165* (2013.01); *A24F 47/002* (2013.01); *B65D 50/046* (2013.01); *Y02W 30/807* (2015.05)

(58) Field of Classification Search
CPC ....... A24F 47/002; B65D 25/48; B65D 43/16; B65D 83/0094
(Continued)

(56) References Cited

U.S. PATENT DOCUMENTS 228,598 A * 6/1880 Buckley .................. 206/266
523,254 A * 7/1894 Winkley ............ B65D 47/2031
222/213
(Continued)

OTHER PUBLICATIONS

PCT/US2014/070117; International Search Report and Written Opinion of the ISA dated May 19, 2015; 7 pages.

*Primary Examiner* — Patrick M Buechner
*Assistant Examiner* — Michael J Melaragno
(74) *Attorney, Agent, or Firm* — Hankin Patent Law, APC; Kevin Schraven; Anooj Patel

(57) ABSTRACT

An e-liquid dispenser. The e-liquid dispenser may contain and dispense e-liquids for use in e-cigarettes and comprise a hinged container having a bottom housing and a pivotally-attached lid, and a removable e-bottle used to hold and dispense the e-liquid. The e-bottle may be child resistant and may comprise a raised portion on a wall of the e-bottle, wherein the raised portion may match an opening in a wall of the bottom housing such that when the e-bottle is inserted into the bottom housing, it is securely held in the bottom housing. E-liquid is expelled from the e-bottle by a user pressing on the raised portion. The e-bottle may be removed by depressing the raised portion and pushing the e-bottle out of the bottom housing. The removable e-bottle may also include a spout that allows the e-bottle to be refilled so that the e-bottle is reusable.

14 Claims, 16 Drawing Sheets

Related U.S. Application Data 12, 2014, now abandoned, and a continuation-in-part of application No. 29/477,434, filed on Dec. 20, 2013, now Pat. No. Des. 765,908.

(60) Provisional application No. 61/919,678, filed on Dec. 20, 2013.

(51) Int. Cl.
*A24F 47/00* (2006.01)
*B65D 50/04* (2006.01)

(58) Field of Classification Search
USPC .............. 222/206, 214, 153.14; 239/327
See application file for complete search history.

(56) References Cited

U.S. PATENT DOCUMENTS

| | | | | |
|---|---|---|---|---|
| 630,277 A * | 8/1899 | Weitling | ............... | B05B 11/043 |
| | | | | 222/212 |
| 657,267 A * | 9/1900 | Epstein | ............... | A24F 15/18 |
| | | | | 16/307 |
| 697,601 A | 4/1902 | Biren | | |
| 744,074 A * | 11/1903 | Hiering | ............... | B65D 50/045 |
| | | | | 206/1.5 |
| 1,032,326 A * | 7/1912 | Erichsen | ............... | 220/830 |
| 1,093,481 A * | 4/1914 | Savage | ............... | B65D 23/001 |
| | | | | 215/12.1 |
| 1,188,067 A * | 6/1916 | Greer | ............... | B65D 47/2031 |
| | | | | 222/212 |
| 2,064,584 A * | 12/1936 | Aronson | ............... | B65D 47/02 |
| | | | | 141/113 |
| D134,173 S | 10/1942 | Kanter | | |
| 2,509,462 A * | 5/1950 | Vogel | ............... | E05F 1/1215 |
| | | | | 16/307 |
| 2,557,048 A * | 6/1951 | Haase | ............... | A45C 13/007 |
| | | | | 16/295 |
| 2,672,141 A * | 3/1954 | Filger | ............... | B65D 47/18 |
| | | | | 128/200.22 |
| 2,675,146 A * | 4/1954 | Russell | ............... | B65D 5/723 |
| | | | | 222/183 |
| 2,906,439 A * | 9/1959 | Santuci, Sr. | ....... | B65D 47/0895 |
| | | | | 220/810 |
| D168,121 S | 10/1963 | Rachel | | |
| D196,934 S | 11/1963 | Grushon | | |
| D205,085 S | 6/1966 | Goessling | | |
| 3,325,031 A * | 6/1967 | Singier | ............... | A61J 1/05 |
| | | | | 215/232 |
| 3,341,083 A * | 9/1967 | Stewart | ............... | B05B 11/061 |
| | | | | 222/209 |
| 3,412,907 A * | 11/1968 | Faso | ............... | A45D 34/02 |
| | | | | 222/187 |
| D218,281 S | 8/1970 | Diener | | |
| 3,548,446 A * | 12/1970 | Hocq | ............... | E05D 3/18 |
| | | | | 16/295 |
| D228,037 S | 7/1973 | Wood | | |
| D228,039 S | 7/1973 | Wood | | |
| D229,519 S | 12/1973 | Wood | | |
| 3,926,347 A * | 12/1975 | Low | ............... | B65D 35/28 |
| | | | | 222/181.2 |
| D249,870 S | 10/1978 | Tillander | | |
| 4,168,032 A * | 9/1979 | Sneider | ............... | A61M 3/0262 |
| | | | | 222/105 |
| 4,563,104 A * | 1/1986 | Saint-Amand | ............ | B01L 3/021 |
| | | | | 222/192 |
| 4,779,768 A * | 10/1988 | St. Amand | ............... | B01L 3/021 |
| | | | | 141/24 |
| 4,787,536 A * | 11/1988 | Widerstrom | ............ | G01F 11/082 |
| | | | | 206/532 |
| 4,930,668 A * | 6/1990 | Krall | ............... | A47K 5/122 |
| | | | | 222/185.1 |
| 5,048,727 A * | 9/1991 | Vlasich | ............... | A61F 9/0008 |
| | | | | 222/209 |
| D326,339 S | 5/1992 | Sherman | | |
| D328,431 S | 8/1992 | Skidmore | | |
| D338,336 S | 8/1993 | Grant | | |
| 5,337,924 A * | 8/1994 | Dickie | ............... | B65D 1/32 |
| | | | | 215/383 |
| 5,348,194 A | 9/1994 | Mascitelli et al. | | |
| 5,649,648 A * | 7/1997 | Lier | ............... | B65D 1/32 |
| | | | | 222/206 |
| 5,673,822 A * | 10/1997 | Chalmin | ............... | A61F 9/0008 |
| | | | | 222/183 |
| 5,784,087 A * | 7/1998 | Wallace | ............... | B41J 2/17513 |
| | | | | 222/207 |
| 5,791,525 A * | 8/1998 | Fan | ............... | A47K 5/1204 |
| | | | | 222/181.3 |
| 5,927,548 A * | 7/1999 | Villaveces | ............... | A45F 5/02 |
| | | | | 222/175 |
| 5,950,848 A * | 9/1999 | Baudin | ............... | B65D 47/0814 |
| | | | | 215/237 |
| 6,062,437 A * | 5/2000 | Mascitelli | .......... | B65D 83/0072 |
| | | | | 222/212 |
| 6,142,333 A * | 11/2000 | Sasamoto | ............... | B60R 7/04 |
| | | | | 220/263 |
| 6,142,344 A * | 11/2000 | Kai | ............... | B65D 75/5883 |
| | | | | 222/105 |
| 6,240,930 B1 * | 6/2001 | Yuhara | ............... | A45C 13/008 |
| | | | | 132/293 |
| 6,296,151 B1 * | 10/2001 | Chen | ............... | A45D 34/02 |
| | | | | 222/153.13 |
| D462,139 S | 8/2002 | Sagmeister | | |
| 6,460,781 B1 * | 10/2002 | Garcia | ............... | A45D 37/00 |
| | | | | 222/107 |
| 6,520,367 B1 * | 2/2003 | Piroch | ............... | A47F 1/06 |
| | | | | 220/4.21 |
| 6,561,391 B1 * | 5/2003 | Baker | ............... | B65D 43/169 |
| | | | | 220/200 |
| D499,019 S | 11/2004 | Sagmeister | | |
| 6,860,387 B2 * | 3/2005 | Chang | ............... | B65D 43/24 |
| | | | | 16/295 |
| 7,100,806 B2 * | 9/2006 | Schuster | ............... | A47G 19/24 |
| | | | | 220/254.2 |
| 7,121,432 B2 * | 10/2006 | Kostal | ............... | F41H 9/10 |
| | | | | 222/113 |
| D554,510 S | 11/2007 | Dorn | | |
| D567,646 S | 4/2008 | Ballard | | |
| D571,216 S | 6/2008 | Christian | | |
| D578,302 S | 10/2008 | Arvidsson | | |
| D586,656 S | 2/2009 | Mount | | |
| 7,651,009 B2 * | 1/2010 | Grant | ............... | A44B 15/005 |
| | | | | 222/183 |
| D613,609 S | 4/2010 | Pok | | |
| D618,391 S | 6/2010 | Moore | | |
| D622,901 S | 8/2010 | Smith | | |
| 8,038,034 B2 * | 10/2011 | Pelfrey | ............... | A45D 34/04 |
| | | | | 222/153.13 |
| D653,391 S | 1/2012 | Chuan | | |
| 8,092,434 B2 * | 1/2012 | Harlan | ............... | A61H 35/04 |
| | | | | 239/323 |
| D668,140 S | 10/2012 | Collins | | |
| D668,533 S | 10/2012 | Collins | | |
| D668,535 S | 10/2012 | Collins | | |
| 8,336,790 B2 * | 12/2012 | Kolins | ............... | A61L 9/042 |
| | | | | 222/206 |
| 8,474,638 B2 * | 7/2013 | Pedmo | ............... | B65D 1/0223 |
| | | | | 215/379 |
| 8,646,658 B2 * | 2/2014 | Bae | ............... | A45D 34/02 |
| | | | | 222/182 |
| 8,833,616 B2 * | 9/2014 | Lin | ............... | B65D 47/0871 |
| | | | | 222/507 |
| D723,373 S | 3/2015 | Wahl | | |
| D732,394 S | 6/2015 | DeMarco | | |
| 9,089,166 B1 * | 7/2015 | Scatterday | ............... | A24F 15/12 |
| D736,455 S | 8/2015 | Liu | | |
| D738,570 S | 9/2015 | VanNostran | | |
| 2002/0036207 A1 * | 3/2002 | Ohuo | ............... | A47G 19/2266 |
| | | | | 220/830 |
| 2003/0006309 A1 * | 1/2003 | Duqueroie | ............ | B05B 11/048 |
| | | | | 239/327 |

(56) References Cited

U.S. PATENT DOCUMENTS

| | | | |
|---|---|---|---|
| 2003/0010844 A1* | 1/2003 | Duqueroie | B05B 11/048 239/327 |
| 2003/0136783 A1* | 7/2003 | Hatsumoto | A47G 19/2266 220/254.3 |
| 2004/0149778 A1* | 8/2004 | Altonen | B65D 83/206 222/212 |
| 2005/0211241 A1 | 9/2005 | Anderson et al. | |
| 2006/0151535 A1* | 7/2006 | Duquet | A45D 34/04 222/183 |
| 2007/0023453 A1* | 2/2007 | Simkins | A47K 5/122 222/183 |
| 2007/0045358 A1* | 3/2007 | Arancibia | B65D 25/42 222/566 |
| 2007/0102389 A1* | 5/2007 | Hoepner | B65D 47/0885 215/235 |
| 2007/0102390 A1* | 5/2007 | Hoepner | B65D 47/0885 215/235 |
| 2007/0102391 A1* | 5/2007 | Hoepner | B65D 47/0885 215/235 |
| 2007/0151993 A1* | 7/2007 | Yelland | B65D 23/102 222/546 |
| 2007/0175931 A1* | 8/2007 | Leoncavallo | B65D 47/0895 222/556 |
| 2007/0228042 A1* | 10/2007 | Yeager | B65D 47/0804 220/254.3 |
| 2007/0267444 A1* | 11/2007 | de Buzzaccarini | B65D 81/30 222/179.5 |
| 2007/0270325 A1* | 11/2007 | de Buzzaccarini | B65D 47/2018 510/424 |
| 2008/0015135 A1* | 1/2008 | de Buzzaccarini | C11D 3/0094 510/336 |
| 2008/0029548 A1* | 2/2008 | De Wree | A47K 5/122 222/212 |
| 2008/0032909 A1* | 2/2008 | de Buzzaccarini | C11D 3/50 510/293 |
| 2009/0114617 A1* | 5/2009 | Inomata | B65D 1/0292 215/379 |
| 2009/0188214 A1* | 7/2009 | Vohnout-Marle | G07D 11/0006 53/492 |
| 2010/0051496 A1* | 3/2010 | Watson | A61F 15/003 206/440 |
| 2010/0127012 A1* | 5/2010 | Takeuchi | H02G 3/14 220/810 |
| 2010/0140283 A1* | 6/2010 | Brozell | B65D 1/06 220/810 |
| 2010/0282779 A1* | 11/2010 | Ramsey | A45C 11/24 222/182 |
| 2010/0327009 A1* | 12/2010 | Hofte | B05B 7/2402 222/1 |
| 2011/0011886 A1* | 1/2011 | Zaima | A61L 2/26 222/1 |
| 2011/0082409 A1* | 4/2011 | Reishus | A61M 35/003 604/20 |
| 2012/0114819 A1 | 5/2012 | Ragnarsson et al. | |
| 2012/0167906 A1 | 7/2012 | Gysland | |
| 2012/0181283 A1* | 7/2012 | Wahl | B65D 11/10 220/500 |
| 2012/0227753 A1 | 9/2012 | Newton | |
| 2012/0267397 A1* | 10/2012 | Inaba | B65D 1/32 222/209 |
| 2012/0285995 A1* | 11/2012 | Inaba | B65D 1/0223 222/215 |
| 2013/0248385 A1* | 9/2013 | Scatterday | A24F 15/12 206/86 |
| 2014/0034644 A1* | 2/2014 | Wahl | B65D 43/16 220/254.6 |
| 2015/0048088 A1* | 2/2015 | Giraud | B65D 83/0427 220/315 |
| 2016/0081391 A1* | 3/2016 | Zahr | B65D 77/0453 222/183 |

\* cited by examiner

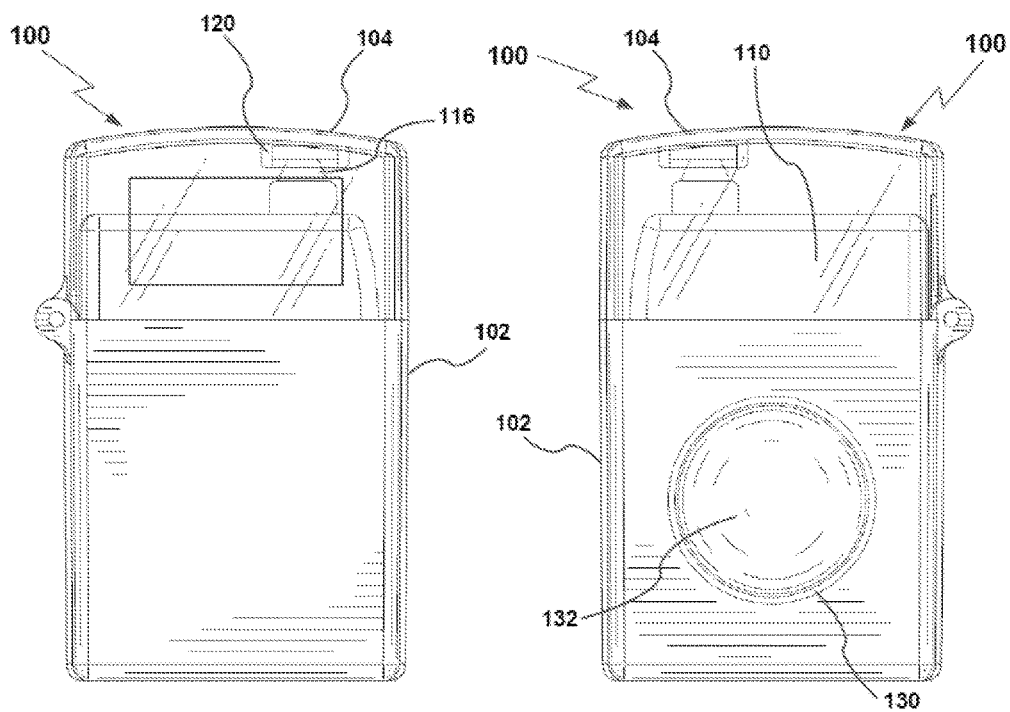

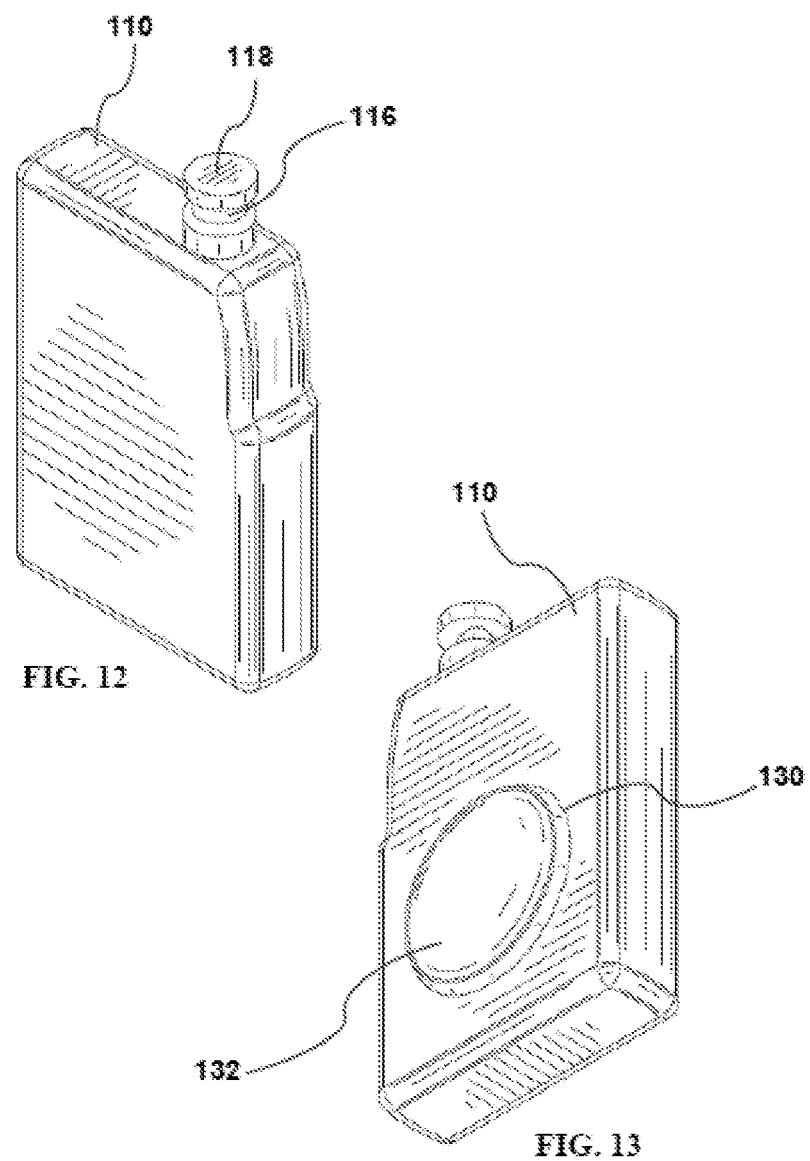

E-LIQUID DISPENSER

CROSS-REFERENCE TO RELATED APPLICATIONS

This Application is a continuation-in-part application of U.S. patent application Ser. No. 14/785,246, titled "E-Liquid Dispenser", filed on Oct. 16, 2015, by co-inventors Rabih Zahr, Shady Makarem, and Nedal Makarem, the contents of which are incorporated by reference herein in their entirety and to which priority is claimed. This Application also claims priority to U.S. Design patent application No. 29/477,434, titled "E-Liquid Dispenser", filed on Dec. 20, 2013, by co-inventors Rabih Zahr, Shady Makarem, and Nedal Makarem, the contents of which are incorporated by reference herein in their entirety. U.S. patent application Ser. No. 14/785,246 is a National Stage Application of International Patent Cooperation Treaty ("PCT") Patent Application No. PCT/US2014/070117, titled "E-Liquid Dispenser", filed on Dec. 12, 2014, by co-inventors Rabih Zahr, Shady Makarem, and Nedal Makarem, the contents of which are incorporated by reference herein in their entirety and to which priority is claimed. U.S. patent application Ser. No. 14/785,246 and PCT Patent Application No. PCT/US2014/070117 claim the benefit of U.S. Provisional Patent Application Ser. No. 61/919,678, titled "E-Liquid Dispenser," filed on Dec. 20, 2013, by co-inventors Rabih Zahr, Shady Makarem, and Nedal Makarem, the contents of which are incorporated by reference herein in their entirety.

BACKGROUND

1. Field

The present disclosure relates generally to hinged containers, and more particularly to e-liquid dispensers that hold liquid that is atomized for electronic cigarettes. Preferably, the hinged containers comprise a child resistant locking mechanism to prevent unintended use by minors.

1. Description of Related Art

An electronic cigarette (or e-cigarette or smokeless cigarette) is an electronic device that simulates the act of tobacco smoking by converting a liquid into an inhaled mist or aerosol having the physical sensation, appearance, nicotine content, and flavor of inhaled tobacco smoke, without the odor and well-known health risks associated with the burning of tobacco and inhaling the smoke thereof when smoking cigarettes. Lighting a traditional cigarette causes the tobacco to burn, releasing smoke, which contains nicotine and other chemicals. The user breathes in the smoke to deliver nicotine to the lungs, as well as harmful chemicals, such as carbon dioxide, volatile organic compounds, and carcinogenic tar.

An electronic cigarette does not include the process of tobacco combustion and smoke inhalation. Instead, the electronic cigarette heats a liquid containing nicotine in varying concentrations and converts the liquid to a vapor or mist that the user inhales. Depending on the electronic cigarette, the user may simply inhale from the cartridge to begin the vaporization process that results in a vapor without the tar. An e-cigarette generally uses heat or ultrasonics to vaporize a propylene glycol- or glycerine-based liquid solution into a vapor for inhalation.

Electronic cigarettes generally comprise three essential components: (1) a cartridge, (2) an atomizer, and (3) a rechargeable battery unit. The "cartridge" serves as a mouthpiece and usually doubles as a small reservoir that holds the liquid that is to be vaporized. The "atomizer" serves as the heating element responsible for vaporizing the liquid to provide the aerosol mist and may be coupled to the cartridge. If the cartridge and the atomizer are combined, the combination may be referred to as a "cartomizer." The "rechargeable battery unit" powers the electronic cigarette, and, when the user inhales, the atomizer is activated and heats and vaporizes the liquid, which is then inhaled through the mouthpiece.

The contents of the liquid solution used to produce the aerosol mist in electronic cigarettes vary widely, but they commonly include distilled water and flavorings (e.g., tobacco smoke, menthol, mint, coffee, chocolate) in a propylene glycol or glycerin base. Nicotine may also be included in solutions in varying degrees intended to fulfill a nicotine replacement role, without the carcinogenic tar associated with tobacco smoke, but the liquid may also be nicotine free. This liquid solution may commonly be referred to as an "e-liquid."

After the e-liquid is depleted, the user may replace the cartridge if it is a prefilled cartridge. Alternatively, the user may also purchase bottles of e-liquid and refill the cartridge himself or herself. In the latter case, e-liquids of varying compositions may be purchased in small glass bottles, such as small 5 ml bottles of various sizes, such as 5 ml, 10 ml, 20 ml, 30 ml, or even larger. These bottles are typically capped. In some bottles, the cap may include an eye dropper for dispensing the e-liquid into a cartridge or cartomizer.

As many consumers of e-cigarettes wish to experience the same sensations and actions as tobacco smokers, a user may inhale the e-cigarette as she would with a regular cigarette. For example, some e-cigarettes include a light-emitting diode (LED) that lights up when the user inhales, giving the appearance of a flame at the end of the e-cigarette. Also, the e-cigarette may take the form of a cigarette in an old-fashioned holder, and the smaller versions of e-cigarettes may take the form and shape of a traditional tobacco cigarette.

Unfortunately, due to the increase popularity of e-cigarettes, many young children have been exposed to e-cigarettes and as a result have expressed an interest in using e-cigarettes. Some children have sought out the use of electronic cigarettes without the knowledge or consent of their parents. Thus, to help minimize use by young children, it would be beneficial to provide an e-liquid container with child resistant features.

With more widespread use of e-cigarettes, there is now a need for an improved design of e-liquid dispensers that is more acceptable to these consumers of e-cigarettes. Preferably, the new and improved e-liquid dispenser comprises a child resistant mechanism, making access to the e-liquid tamper-resistant by minors. Preferably, this child resistant mechanism may also be utilized by other various hinged containers.

SUMMARY OF ILLUSTRATIVE EMBODIMENTS

To minimize the limitations in the prior art, and to minimize other limitations that will become apparent upon reading and understanding the present specification, the following discloses a new and improved e-liquid dispenser with a child resistant mechanism.

One embodiment may be an e-liquid dispenser with a child resistant mechanism, comprising: a bottom housing; a lid; and a child resistant mechanism; wherein the lid may be adapted to pivotally close with the bottom housing, such that the e-liquid dispenser has a closed configuration; and wherein the child resistant mechanism may be adapted to keep the e-liquid dispenser in the closed configuration and wherein the child resistant mechanism substantially prevents a child from being able to open the e-liquid dispenser. The child resistant mechanism may comprise a latch and an indentation; and wherein the latch and the indentation may be disposed opposite one another on the bottom housing and the lid, such that when the e-liquid dispenser is in the closed configuration, the latch and the indentation are releaseably coupled together. The bottom housing may comprise: a front wall, a rear wall, a first sidewall, and a second sidewall; wherein the first sidewall of the bottom housing may comprise the latch; wherein the lid may comprise a first sidewall and a second sidewall; wherein the first sidewall of the lid may comprise the indentation; wherein the second sidewall of the lid may be pivotally coupled to the second sidewall of the bottom housing; and wherein when the e-liquid dispenser is closed, the latch of the bottom housing matingly engages with the indentation of the lid. The bottom housing may comprise: a front wall, a rear wall, a first sidewall, and a second sidewall; wherein the first sidewall of the bottom housing may comprise the indentation; wherein the lid may comprise a first sidewall and a second sidewall; wherein the first sidewall of the lid may comprise the latch; wherein the second sidewall of the lid may be pivotally coupled to the second sidewall of the bottom housing; and wherein when the e-liquid dispenser is closed, the indentation of the bottom housing may matingly engage with the latch of the lid. An e-bottle may be adapted to removeably fit within an interior of the bottom housing; and wherein a rear wall of the e-bottle may comprise a raised portion that fits snugly within an opening at the rear wall of the bottom housing. The e-liquid dispenser with a child resistant mechanism may further comprise: a hinge assembly pivotally coupling the lid to the bottom housing, comprising: one or more housing hinge barrels; one or more lid hinge barrels; and a roll pin; wherein the one or more lid hinge barrels may be located at a bottom edge of the second sidewall of the lid and may comprise one or more lid hinge barrel openings; wherein the one or more housing hinge barrels may be located at an upper edge of the second sidewall of the bottom housing and may comprise one or more housing hinge barrel openings; wherein the one or more lid hinge barrel openings may be substantially oblong in shape; and wherein the roll pin may be disposed between the one or more lid hinge barrel openings and the one or more housing hinge barrel openings, such that the lid may be pivotally and slideably coupled to the bottom housing. The e-liquid dispenser with a child resistant mechanism may further comprise: a hinge assembly pivotally coupling the lid to the bottom housing, comprising: one or more housing hinge barrels; one or more lid hinge barrels; and a roll pin; wherein the one or more lid hinge barrels may be located at a bottom edge of the second sidewall of the lid and may comprise one or more lid hinge barrel openings; wherein the one or more housing hinge barrels may be located at an upper edge of the second sidewall of the bottom housing and may comprise one or more housing hinge barrel openings; wherein the one or more housing hinge barrel openings may be substantially oblong in shape; and wherein the roll pin may be disposed between the one or more lid hinge barrel openings and the one or more housing hinge barrel openings, such that the bottom housing is pivotally and slideably coupled to the lid. The lid may comprises at least two ribbed portions located within the interior of the first sidewall; and wherein the indentation may be disposed between the at least two ribbed portions, such that the at least two ribbed portions are adapted to guide the latch into the indentation.

Another embodiment may be an e-liquid dispenser with a child resistant mechanism, comprising: a bottom housing; a lid; a child resistant mechanism; and an e-bottle; wherein the lid may be adapted to pivotally close with the bottom housing, such that the e-liquid dispenser has a closed configuration; wherein the child resistant mechanism may be adapted to keep the e-liquid dispenser in the closed configuration and may comprises a latch and an indentation; wherein the latch and the at least one indentation may be disposed opposite one another on the bottom housing and the lid, such that when the e-liquid dispenser is in the closed configuration, the latch and the indentation are releaseably coupled together; wherein the bottom housing may comprise: a front wall, a rear wall, a first sidewall, a second sidewall, and an opening; wherein the first sidewall of the bottom housing may comprise the latch; wherein the lid may comprise a first sidewall and a second sidewall; wherein the first sidewall of the lid may comprise the indentation; wherein the second sidewall of the lid may be pivotally coupled to the second sidewall of the bottom housing; wherein when the e-liquid dispenser is closed, the latch of the bottom housing may matingly engage with the indentation of the lid; wherein the e-bottle may be adapted to removeably fit within an interior of the bottom housing; and wherein a rear wall of the e-bottle may comprise a raised portion that fits snugly within the opening located at the rear wall of the bottom housing. The e-liquid dispenser with a child resistant mechanism may further comprise: a hinge assembly pivotally coupling the lid to the bottom housing, comprising: one or more housing hinge barrels; one or more lid hinge barrels; and a roll pin; wherein the one or more lid hinge barrels may be located at a bottom edge of the second sidewall of the lid and may comprise one or more lid hinge barrel openings; wherein the one or more housing hinge barrels may be located at an upper edge of the second sidewall of the bottom housing and may comprise one or more housing hinge barrel openings; wherein the one or more lid hinge barrel openings may be substantially oblong in shape; and wherein the roll pin may be disposed between the one or more lid hinge barrel openings and the one or more housing hinge barrel openings, such that the lid is pivotally and slideably coupled to the bottom housing. The lid may comprise at least two ribbed portions located within the interior of the first sidewall; and wherein the indentation may be disposed between the at least two ribbed portions, such that the at least two ribbed portions are adapted to guide the latch into the indentation. The raised portion of the e-bottle may be substantially circular in shape having a first diameter; wherein the opening of the rear wall of the bottom housing may also be substantially circular in shape having a second diameter; and wherein the first diameter may be approximately equal to the second diameter, such that the raised portion of the e-bottle snugly fits with the opening of the rear wall of the bottom housing. The hinge assembly may further comprise a torsion spring adapted for exerting a bias between the lid and the bottom housing. The e-bottle may comprise a spout adapted to dispense the e-liquid from the e-bottle and receive the e-liquid for filling the e-bottle.

Another embodiment may be an e-liquid dispenser with a child resistant mechanism, comprising: a bottom housing; a lid; a child resistant mechanism; and an e-bottle; wherein the lid may be adapted to pivotally close with the bottom housing, such that the e-liquid dispenser has a closed configuration; wherein the child resistant mechanism may be adapted to keep the e-liquid dispenser in the closed configuration and may comprise a latch and an indentation; wherein the at least one latch and the at least one indentation may be disposed opposite one another on the bottom housing and the lid, such that when the e-liquid dispenser is in the closed configuration, the latch and the indentation may be releaseably coupled together; wherein the bottom housing may comprise: a front wall, a rear wall, a first sidewall, a second sidewall, and an opening; wherein the first sidewall of the bottom housing may comprise the indentation; wherein the lid may comprise a first sidewall and a second sidewall; wherein the first sidewall of the lid may comprise the latch; wherein the second sidewall of the lid may be pivotally coupled to the second sidewall of the bottom housing; wherein when the e-liquid dispenser is closed, the indentation of the bottom housing may matingly engage with the latch of the lid; wherein the e-bottle may be adapted to removeably fit within an interior of the bottom housing; and wherein a rear wall of the e-bottle may comprise a raised portion that fits snugly within the opening located at the rear wall of the bottom housing. The e-liquid dispenser with a child resistant mechanism may further comprise: a hinge assembly pivotally coupling the lid to the bottom housing, comprising: one or more housing hinge barrels; one or more lid hinge barrels; and a roll pin; wherein the one or more lid hinge barrels may be located at a bottom edge of the second sidewall of the lid and may comprise one or more lid hinge barrel openings; wherein the one or more housing hinge barrels may be located at an upper edge of the second sidewall of the bottom housing and may comprise one or more housing hinge barrel openings; wherein the one or more housing hinge barrel openings may be substantially oblong in shape; and wherein the roll pin may be disposed between the one or more lid hinge barrel openings and the one or more housing hinge barrel openings, such that the bottom housing is pivotally and slideably coupled to the lid. The bottom housing may comprise at least two ribbed portions located within the interior of the first sidewall; and wherein the indentation may be disposed between the at least two ribbed portions, such that the at least two ribbed portions are adapted to guide the latch into the indentation. The raised portion of the e-bottle may be substantially circular in shape having a first diameter; wherein the opening of the rear wall of the bottom housing may also be substantially circular in shape having a second diameter; and wherein the first diameter may be approximately equal to the second diameter, such that the raised portion of the e-bottle snugly fits with the opening of the rear wall of the bottom housing. The hinge assembly may further comprise a torsion spring adapted for exerting a bias between the lid and the bottom housing. The e-bottle may comprise a spout adapted to dispense the e-liquid from the e-bottle and receive the e-liquid for filling the e-bottle.

Another embodiment may be an e-liquid dispenser with a child resistant mechanism, comprising: a bottom housing, a lid, and an e-bottle; wherein the bottom housing may comprise: a front wall, a rear wall, a first sidewall having a latch, and a second sidewall; wherein the lid may comprise a second sidewall, a first sidewall, and an indentation located within an interior of the first sidewall; wherein the second sidewall of the lid may be pivotally coupled to the second sidewall of the bottom housing; wherein the e-bottle may be adapted to store an e-liquid and comprises a front wall and a rear wall; wherein the e-bottle may be adapted to be removeably fitted within an interior of the bottom housing; wherein the rear wall of the e-bottle may comprise a raised portion that fits snugly within an opening at the rear wall of the bottom housing; and wherein the lid may be adapted to pivotally close with the bottom housing, such that when the e-liquid dispenser is closed, the latch of the bottom housing matingly engages with the indentation of the lid. The e-liquid dispenser may further comprise a hinge assembly pivotally coupling the lid to the bottom housing, comprising: one or more lid hinge barrels; one or more housing hinge barrels; and a roll pin; wherein the one or more lid hinge barrels may be located at a bottom edge of the second sidewall of the lid and comprise one or more first openings; wherein the one or more housing hinge barrels may be located at an upper edge of the second sidewall of the bottom housing and comprise one or more second openings; wherein the one or more first openings of the one or more lid hinge barrels may be substantially oblong in shape and not circular; and wherein the roll pin may be disposed between the one or more first openings of the one or more lid hinge barrels and one or more second openings of the second hinges, such that the lid is pivotally coupled to the bottom housing. The lid may comprise at least two ribbed portions located within the interior of the first sidewall; and wherein the indentation may be disposed between the at least two ribbed portions, such that the at least two ribbed portions are adapted to guide the latch into the indentation. The latch may vertically traverse beyond an edge of the bottom housing. The raised portion of the e-bottle may be substantially circular in shape having a first diameter; wherein the opening of the rear wall of the bottom housing may also be substantially circular in shape having a second diameter; and wherein the first diameter may be approximately equal to the second diameter, such that the raised portion of the e-bottle matingly engages with the opening of the rear wall of the bottom housing. The hinge assembly may further comprise a torsion spring adapted for exerting a bias between the lid and the bottom housing. The e-bottle may comprise a spout adapted to dispense the e-liquid from the e-bottle and receive the e-liquid for filling the e-bottle.

Another embodiment may be an e-liquid dispenser with a child resistant mechanism, comprising: a bottom housing; a lid; and an e-bottle; wherein the bottom housing may comprise: a front wall, a rear wall, a first sidewall, a second sidewall, and an indentation located within an interior of the right sidewall; wherein the lid may comprise a second sidewall and a first sidewall having a latch; wherein the second sidewall of the lid may be pivotally coupled to the second sidewall of the bottom housing; wherein the e-bottle may be adapted to store the e-liquid and comprises a front wall and a rear wall; wherein the e-bottle may be adapted to be removeably fitted within an interior of the bottom housing; wherein the rear wall of the e-bottle may comprise a raised portion that fits snugly within an opening in the rear wall of the bottom housing; and wherein the lid may be adapted to pivotally close with the bottom housing, such that when the e-liquid dispenser is closed, the latch of the lid matingly engages with the indentation of the bottom housing. The e-liquid dispenser may further comprise a hinge assembly pivotally coupling the lid to the bottom housing, comprising: one or more lid hinge barrels; one or more housing hinge barrels; and a roll pin; wherein the one or more lid hinge barrels may be located at a bottom edge of the second sidewall of the lid and may comprise one or more first openings; wherein the one or more housing hinge barrels may be located at an upper edge of the second sidewall of the bottom housing and may comprise one or more second openings; wherein the one or more second openings of the one or more housing hinge barrels may be substantially oblong in shape and not circular; and wherein the roll pin may be disposed between the one or more first openings of the one or more lid hinge barrels and one or more second openings of the second hinges, such that the lid is pivotally coupled to the bottom housing. The bottom housing may comprise at least two ribbed portions located within the interior of the first sidewall; and wherein the indentation may be disposed between the at least two ribbed portions, such that the at least two ribbed portions are adapted to guide the latch into the indentation. The latch may vertically traverse beyond an edge of the lid. The raised portion of the e-bottle may be substantially circular in shape having a first diameter; wherein the opening of the rear wall of the bottom housing may also be substantially circular in shape having a second diameter; and wherein the first diameter may be approximately equal to the second diameter, such that the raised portion of the e-bottle matingly engages with the opening of the rear wall of the bottom housing. The hinge assembly may further comprise a torsion spring adapted for exerting a bias between the lid and the bottom housing.

Another embodiment may be a hinged container with a child resistant mechanism, comprising: a bottom housing; and a lid; wherein the bottom housing may comprise: a second sidewall and a first sidewall having a latch; wherein the lid may comprise a second sidewall, a first sidewall, and an indentation located within an interior of the first sidewall; wherein the second sidewall of the lid may be pivotally coupled to the second sidewall of the bottom housing; wherein the lid may be adapted to pivotally close with the bottom housing, such that when the hinged container is closed, the latch of the bottom housing matingly engages with the indentation of the lid. The hinged container may further comprise a hinge assembly pivotally coupling the lid to the bottom housing, comprising: one or more lid hinge barrels; one or more housing hinge barrels; and a roll pin; wherein the one or more lid hinge barrels may be located at a bottom edge of the second sidewall of the lid and may comprise one or more first openings; wherein the one or more housing hinge barrels may be located at an upper edge of the second sidewall of the bottom housing and may comprise one or more second openings; wherein the one or more first openings of the one or more lid hinge barrels may be substantially oblong in shape and not circular; and wherein the roll pin may be disposed between the one or more first openings of the one or more lid hinge barrels and one or more second openings of the second hinges, such that the lid is pivotally coupled to the bottom housing. The hinged container may further comprise: a second container; wherein the second container may be adapted to store a liquid and may comprise a front wall and a rear wall; wherein the second container may be adapted to be removeably fitted within an interior of the bottom housing; wherein the bottom housing may comprise: a front wall and a rear wall; and wherein the rear wall of the second container may comprise a raised portion that fits snugly within an opening in the rear wall of the bottom housing. The lid may comprise at least two ribbed portions located within the interior of the first sidewall; and wherein the indentation may be disposed between the at least two ribbed portions, such that the at least two ribbed portions are adapted to guide the latch into the indentation. The latch may vertically traverse beyond the bottom housing. The raised portion of the second container may be substantially circular in shape having a first diameter; wherein the opening of the rear wall of the bottom housing may also be substantially circular in shape having a second diameter; and wherein the first diameter may be approximately equal to the second diameter, such that the raised portion of the second container matingly engages with the opening of the rear wall of the bottom housing. The hinge assembly may further comprise a torsion spring for exerting a bias between the lid and the bottom housing.

It is an object to provide an e-liquid dispenser with a child resistant mechanism.

It is an object to provide a hinged container with a child resistant mechanism.

It is yet another object to overcome the limitations of the prior art.

Other systems, methods, features and advantages will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The drawings are of illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

FIG. 3 shows a front elevation view of one embodiment of the e-liquid dispenser with a child resistant mechanism.

FIG. 4 shows a rear elevation view of one embodiment of the e-liquid dispenser with a child resistant mechanism.

FIG. 12 shows a front perspective view of one embodiment of an e-bottle.

FIG. 13 shows a rear perspective view of one embodiment of the e-bottle.

DETAILED DESCRIPTION OF ILLUSTRATIVE EMBODIMENTS

In the following detailed description, numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of the embodiments.

Although several specific embodiments are disclosed, other embodiments of will become apparent to those skilled in the art from the following detailed description, which shows and describes only several illustrative embodiments. As will be realized, these embodiments are capable of modifications in various obvious aspects, all without departing from the spirit and scope of the present disclosure. Accordingly, these figures are to be regarded as merely illustrative in nature and not restrictive. Also, the reference or non-reference to a particular embodiment shall not be interpreted to limit the scope of the disclosure.

Figure 1:
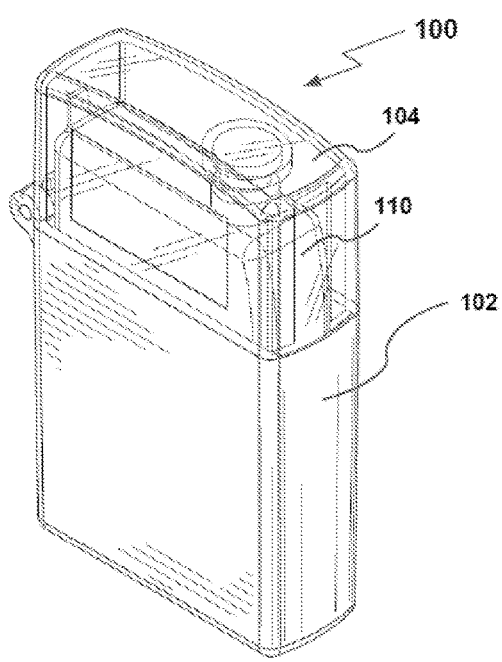
FIG. 1 shows a front perspective view of one embodiment of an e-liquid dispenser with a child resistant mechanism.
Figure 2:
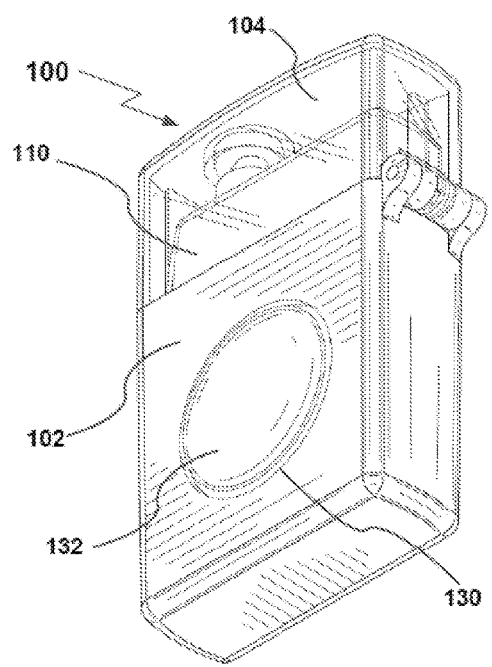
FIG. 2 shows a rear perspective view of one embodiment of the e-liquid dispenser with a child resistant mechanism.

FIG. 1 shows a front perspective view of one embodiment of an e-liquid dispenser with a child resistant mechanism. As shown in FIG. 1, one embodiment of the e-liquid dispenser 100 may comprise: a bottom housing 102, a lid 104, and an e-bottle 110. The lid 104 may be pivotally coupled to the bottom housing 102 to form a hinged container, such that the lid 104 may pivot around a hinge (see FIGS. 7 and 8). Thus, the lid 104 may be used to cover the top portion of the bottom housing 102 when the e-liquid dispenser 100 is in a closed position. In FIGS. 1 and 2, the lid 104 for illustrative purposes appears as being constructed of a transparent material, such as poly(methyl methacrylate) (PMMA) or acrylic glass, such as PLEXIGLAS® or ACRYLITE®, but it may be constructed of any other suitable material, such as stainless steel, aluminum, chrome, various plastics and resins, and the like. Similarly, the bottom housing 102 also may be constructed of various materials, including stainless steel, aluminum, polished chrome, and other metals and metal-alloys, as well as various types of plastics or resins. Shown securely inserted into the bottom housing 102 is the e-bottle 110, which may comprise conical spout (see FIG. 3). The e-bottle 110 may also be refillable and blow molded.

FIG. 2 shows a rear perspective view of one embodiment of the e-liquid dispenser with a child resistant mechanism. FIG. 2 also shows the lid 104 in a closed position over the bottom housing 102. As shown in FIG. 2, the rear wall of the bottom housing may comprise an opening 130, which may be circular. This opening 130 may be used engage with a raised portion 132 of the e-bottle 110, which may be located on the rear surface of the e-bottle 110 (see also FIGS. 10, 11, and 13). By pressing inwardly on this raised portion 132, the user of the e-liquid dispenser 100 may expel e-liquid out of the e-liquid dispenser 100. Importantly, this raised portion 132 may help secure and retain the e-bottle 110 within the bottom housing 102. Thus, by pressing on the raised portion 132 and then pushing the e-bottle 110 upwards, the user may be able to eject and remove the e-bottle 110 from the bottom housing 102, wherein it is being removably held. Thus, unlike conventional e-bottles that require two hands to open and expel e-liquid, the e-bottle 100 disclosed herein provides a user of e-cigarettes a convenient container to hold and dispense his or her e-liquids using a "one handed operation".

FIGS. 3 and 4 show a front elevation and rear elevation view, respectively, of the e-liquid dispenser 100 with its lid 104 closed. The lid 104 may comprise an annular ring 120 positioned inside the lid 104 and above the spout 116, such that the annular ring 120 is at a position to completely cover the spout 116 when the lid 104 is fully closed. FIG. 4, which also shows a rear elevation view of the e-liquid dispenser 100 with its lid 104 closed, shows the raised portion 132 on the rear surface of the e-bottle 110 as protruding through opening 130 of the bottom housing 102. Because the raised portion 132 and opening 130 are both substantially circular, the raised portion 132 preferably helps secure and retain the e-bottle 110 within the bottom housing 102. Although FIGS. 2 and 4 show the raised portion 132 as circular, the raised portion may take any other various shapes such as square, rectangular, or triangular.

Figures 5, 6:
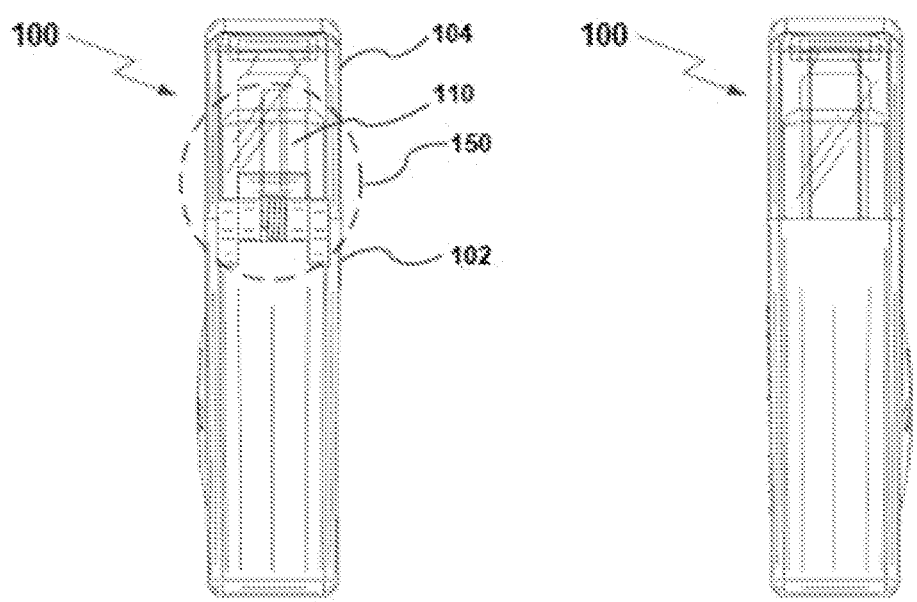
FIG. 5 shows a hinged side elevation view of one embodiment of the e-liquid dispenser with a child resistant mechanism.
FIG. 6 shows a latch side elevation view of one embodiment of the e-liquid dispenser with a child resistant mechanism.

FIGS. 5 and 6 show right side (hinged side) and left side (latch side) elevation views, respectively, of the e-liquid dispenser 100. As shown in FIG. 5, the e-liquid dispenser 100 may comprise a bottom housing 102 and a lid 104, with the e-bottle 110 shown securely inserted into the bottom housing 102. The bottom housing 102 and the lid 104 may be pivotally coupled by a hinge assembly 150, which is described in more detail below.

Figure 7:
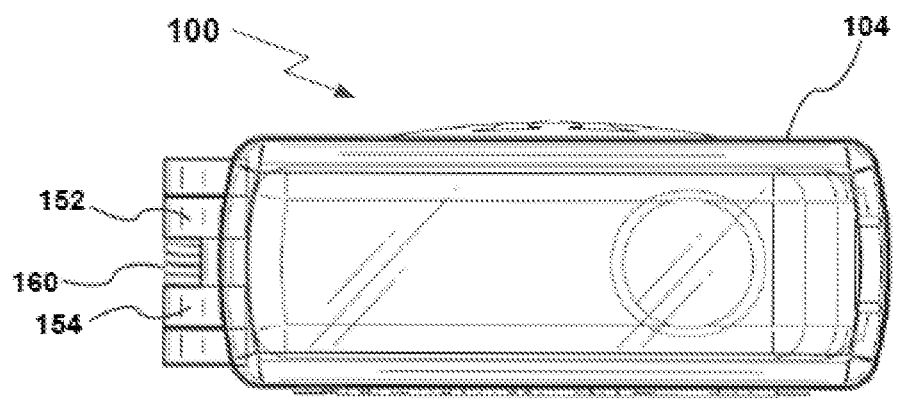
FIG. 7 shows a top plan view of one embodiment of the e-liquid dispenser with a child resistant mechanism.
Figure 8:
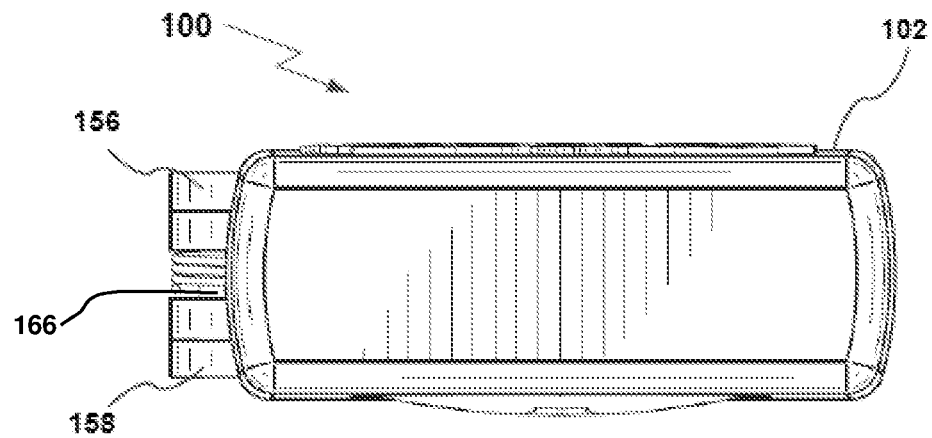
FIG. 8 shows a bottom plan view of one embodiment of the e-liquid dispenser with a child resistant mechanism.

FIGS. 7 and 8 show a top plan view and a bottom plan view, respectively, of the e-liquid dispenser 100. As shown in FIG. 7, the lid 104 may comprise lid hinge barrels, which may comprise a first lid hinge barrel 152 and a second lid hinge barrel 154. FIG. 7 shows that the lid hinge barrels may be coupled or integrated to an edge of the second sidewall of the lid 104. Similarly, FIG. 8 shows that the bottom housing 102 may comprise housing hinge barrels, which may comprise a first housing hinge barrel 156 and a second housing hinge barrel 158. Like the lid hinge barrels, the housing hinge barrels may be coupled or integrated to an edge of the second sidewall of the bottom housing 102. The lid 104 and the bottom housing 102 may be pivotally coupled or connected by inserting a roll pin 166 (shown in FIG. 8) through the lid hinge barrels and the housing hinge barrels—that is, through the first housing hinge barrel 156, second housing hinge barrel 158, first lid hinge barrel 152, and second lid hinge barrel 154. This preferably allows the roll pin 166 to hold and rotatably secure the lid 104 and the bottom housing 102 together, while allowing the lid 104 to rotate relative to the bottom housing 102.

Figure 10:
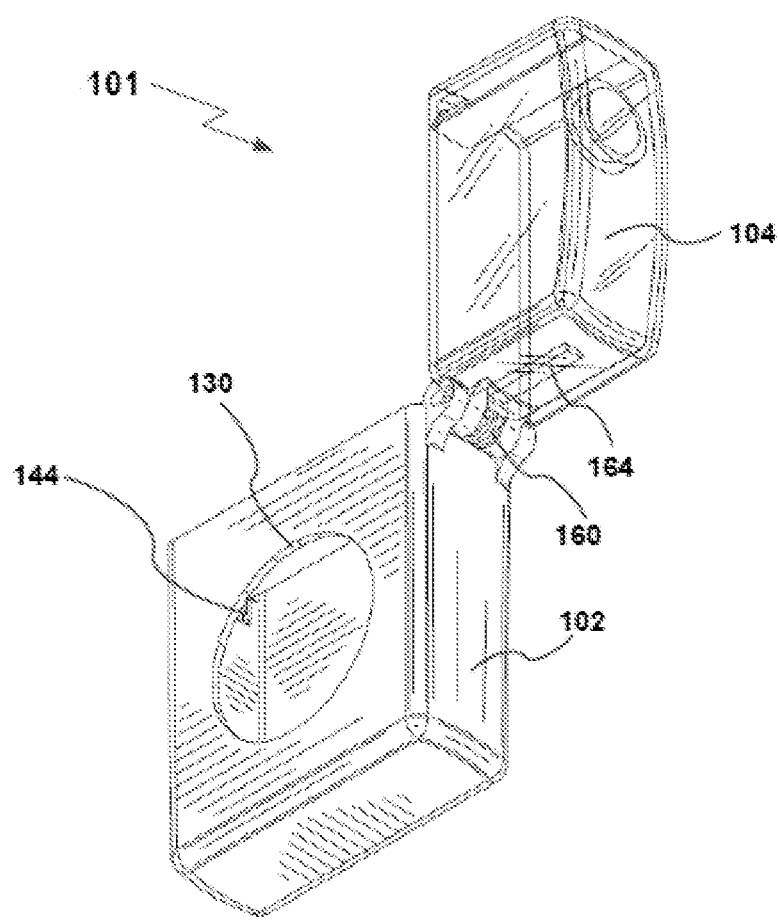
FIG. 10 shows a rear perspective view of one embodiment of a hinged container of the e-liquid dispenser with its lid partially open.

The hinge assembly 150 (shown in FIG. 5) may also comprise a torsion spring 160 (shown in FIG. 7) and a lever 164 (shown in FIG. 10). The torsion spring 160 and lever 164 may be configured, such that lever 164 is spring biased to keep the lid 104 of the e-liquid dispenser 100 closed or opened. Preferably, the spring-biased pressure may be easily overcome by having a user move the lid 104 to the desired position. Accordingly, the purpose of the hinged assembly 150 is preferably to provide a slight spring tension to keep the lid 104 in the closed position when closed and in an open position when open, such that the lid 104 is retained in the closed position but may be easily opened and closed by the user, as required. It is appreciated by those skilled in the art that while the hinge assembly 150 shown includes two pairs of hinge barrels, a torsion spring, and a lever, other implementations of a hinge assembly may include hinges having different configurations, such as three or five barrel hinges, hinges inside or outside the casing, leaf springs, coiled springs with plungers, cams, latches, and the like that will also exert pressure on the lid when open and closed. It is also contemplated that, in other embodiments, the hinged assembly 150 may lack a lever.

Figure 9:
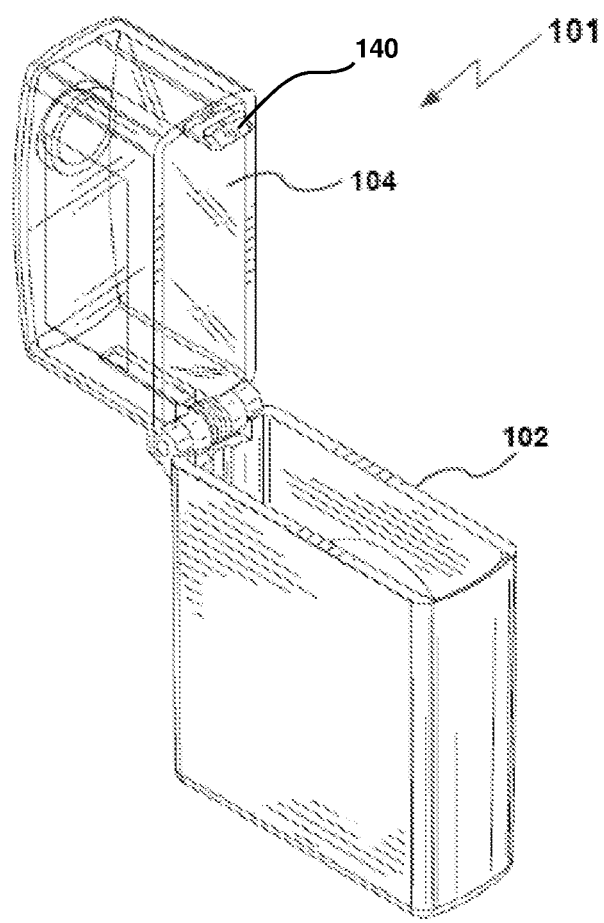
FIG. 9 shows a front perspective view of one embodiment of a hinged container of an e-liquid dispenser with its lid partially open.

FIG. 9 shows a front perspective view of one embodiment of a hinged container of an e-liquid dispenser with its lid partially open. As shown in FIG. 9, one embodiment of the hinged container 101 may comprise a lid 104 and bottom housing 102. Importantly, FIG. 9 also shows that the lid 104 may comprise a latch 140, which is located at the first sidewall, left sidewall, or opposing sidewall away from the hinged assembly 150. The latch 140 may extend beyond the bottom edge of the first sidewall or latch sidewall and is preferably adapted to engage with the indentation 144 (shown in FIG. 10) when the hinged container 100 is closed. In one embodiment, the indentation 144 is preferably located within the interior of the first sidewall of the bottom housing 102.

FIG. 10 shows a rear perspective view of one embodiment of the hinged container of the e-liquid dispenser. As shown in FIG. 10, the opening 130 may be located at the rear wall of the bottom housing 102. Also shown is notch 164 that may be configured to accept an end of the spring 160. FIG. 10 also shows that the indentation 144 or notch may be positioned at the interior portion of the first sidewall or latch sidewall of the bottom housing 102. This allows the indentation 144 or notch to engage with the latch 140.

Figure 11:
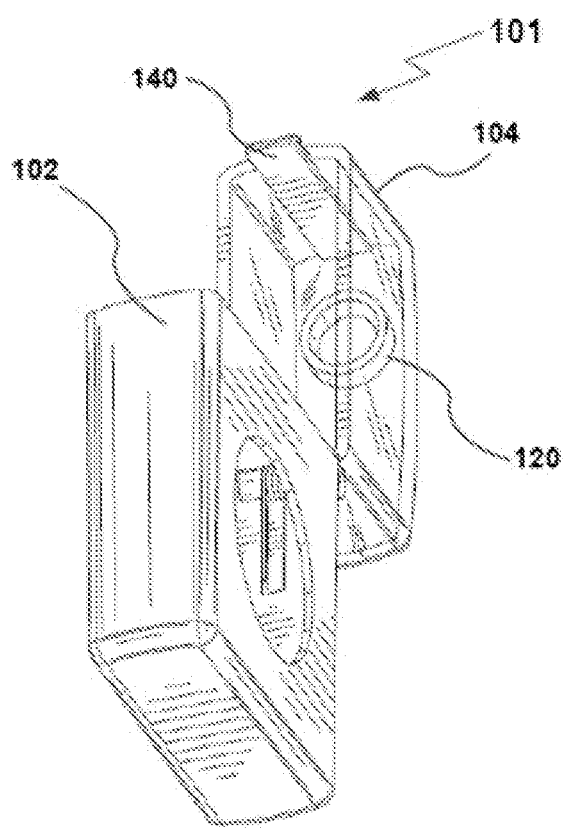
FIG. 11 shows another rear perspective view of one embodiment of the hinged container of the e-liquid dispenser.
Figure 14:
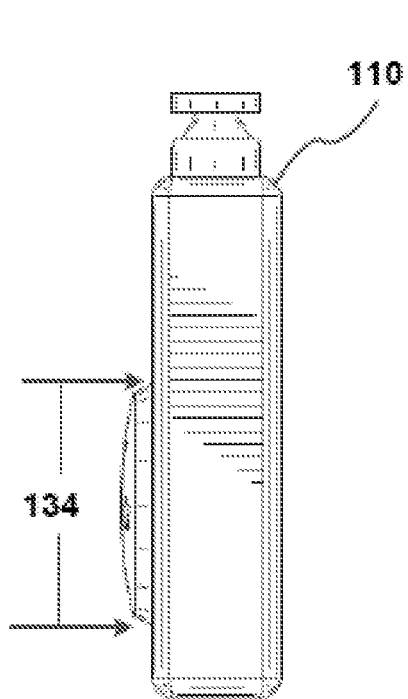
FIG. 14 shows a right side elevation view of one embodiment of the e-bottle.
Figure 15:
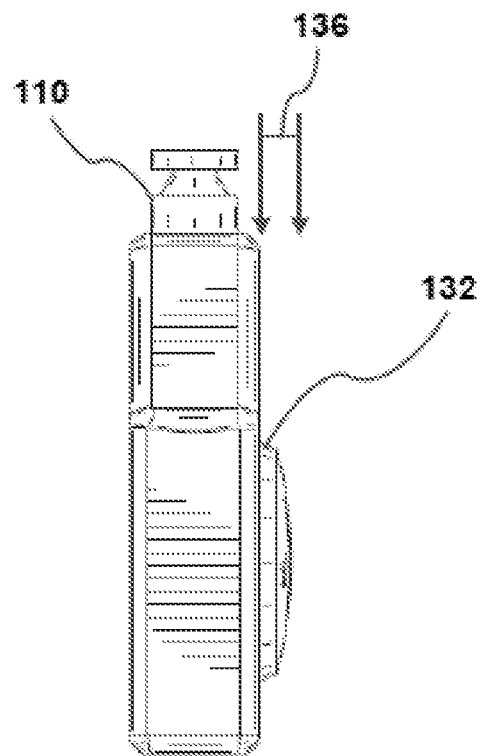
FIG. 15 shows a left side elevation view of one embodiment of the e-bottle.

FIG. 11 shows another rear perspective view of one embodiment of the hinged container of an e-liquid dispenser with its lid partially open. Also shown in FIG. 11 is annular ring 120, which may be positioned inside a top surface of the lid 104. A silicone sealing cap (not shown) may be inserted inside the annular ring 120 in order to help seal the contents of the e-bottle inserted inside the bottom housing 102. FIG. 11 also shows that a latch 140 may be coupled or integrated to the interior of the first sidewall of the lid 104. The latch 140 may help keep the lid 104 closed when the latch 140 is held in place by insertion into the indentation 144 or notch (shown in FIG. 10).

FIGS. 12-15 show various views of one embodiment of an e-bottle that may be snugly secured substantially within the interior of the bottom housing 102. In general, one embodiment of the e-bottle 110 may be constructed of blow molded plastic, which is generally a material that is flexible and can be formed into any desired shape using various blow molding processes. FIG. 12 shows that one embodiment of the e-bottle 110 may also comprise a spout 116 located on a top portion of the e-bottle 110. FIG. 12 also shows that one embodiment of the e-bottle 110 may comprise a cap 118 positioned on top of the spout 116. It is appreciated by those skilled in the art that spout 116 may be integrated into the e-bottle 110 during the blow molding process or may be detachable and interchangeable, that is, may be removed by unscrewing the spout and replacing it with another threaded spout. Likewise, the cap 118 may be a snap-on cap attached to the spout by a plastic strip or may be a removable threaded cap.

FIG. 13 shows that the rear surface of the e-bottle 110 may comprise a raised portion 132. As discussed above, in the embodiment of the e-liquid dispenser 100 shown in FIG. 1, the bottom housing 102 may comprise an opening 130 at the rear wall. The opening 130 may be circular and the diameter of the opening 130 may be approximately the same as the outside diameter of the raised portion 132, if circular. This preferably allows a user of an e-liquid dispenser to insert an e-bottle 110 into a bottom housing so that the circular raised portion 132 will protrude or matingly engage through the opening 130, which is also circular. This will help secure the e-bottle 110 in the e-liquid dispenser 100. In addition to circular shapes, the raised portion 132 may include other shapes, without limitation, such as triangles, squares, rectangles, pentagons, heptagons, hexagons, octagons, etc., so long as the opening 130 in the bottom housing 102 of the e-liquid dispenser has a like shape. Although FIG. 13 shows that the raised portion is located at the rear wall of the e-bottle, another embodiment of the e-bottle may have the raised portion located at the front wall.

Regarding the shape and dimensions of an e-bottle 110, various embodiments of an e-bottle 110 may hold 5, 10, 15, 20, or 30 ml. of e-liquid, or any other volume desired by a manufacturer of an e-bottle 110. In one embodiment, an e-bottle 110 may have a circular raised portion having a diameter 134 of approximately 1.50" and a height 136 of the raised portion may be approximately 0.25". In a preferred embodiment, the raised portion 132 may have a height such that the e-bottle 110 is snugly held in the bottom housing 102 but may be removed when a user exerts upward pressure on the raised portion 132 of the e-bottle 110 to remove the e-bottle 110 from the bottom housing 102. This embodiment of the e-bottle 110 may hold approximately 15 ml of e-liquid, and the spout 116 may be integrated into the e-bottle 110 or may be detachable and interchangeable with other types of spouts, such as a syringe top, a needle nose spout, a spout with attached cap, and the like.

Figure 16:
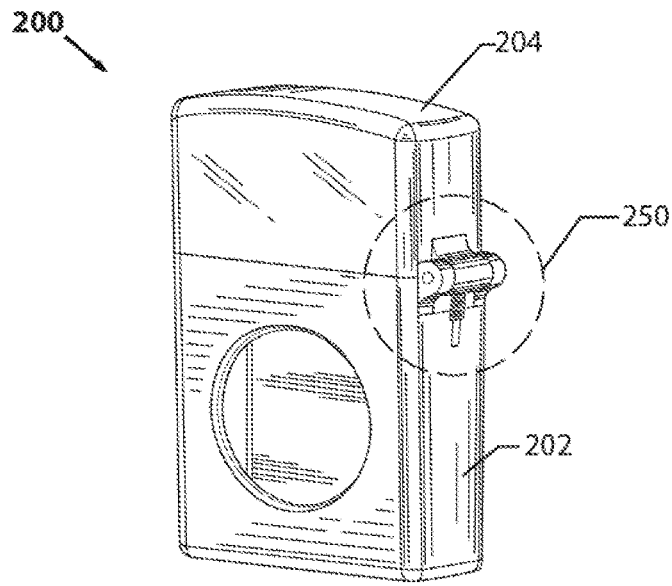
FIG. 16 shows a rear perspective view of another embodiment of a hinged container of an e-liquid dispenser with its lid closed.
Figure 17:
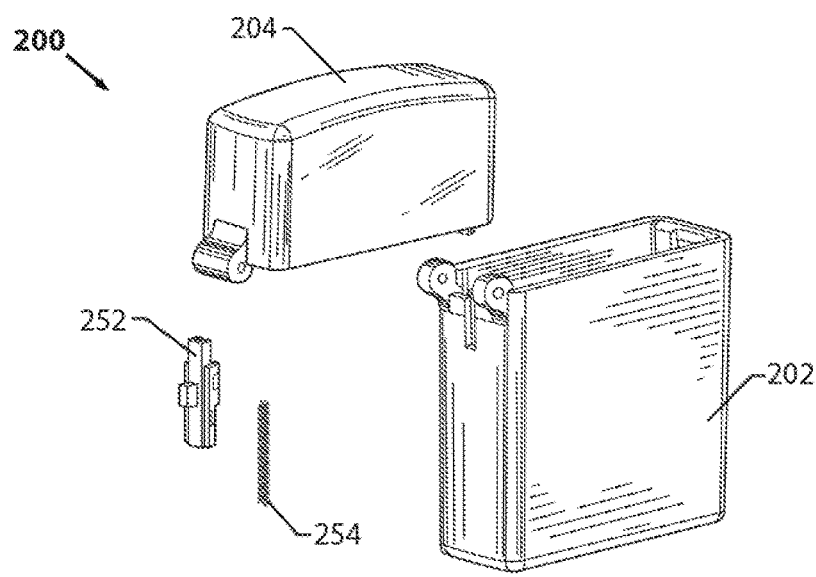
FIG. 17 shows a front exploded perspective view of another embodiment of the hinged container of the e-liquid dispenser with its lid closed.
Figure 18:
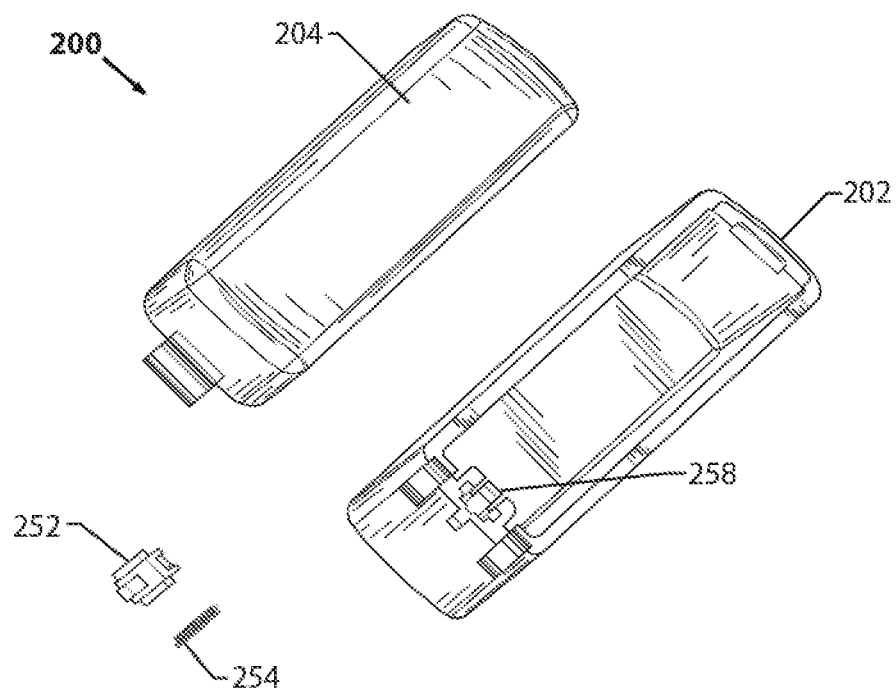
FIG. 18 shows a top exploded perspective view of another embodiment of the hinged container of the e-liquid dispenser.

FIGS. 16-18 are illustrations of another embodiment of a hinged container 200 of an e-liquid dispenser. The hinged container 200 may comprise a lid 204 and a bottom housing 202 that are pivotally coupled to each other via a hinge assembly 250. In addition to the elements shown in the embodiment depicted in FIGS. 7, 8, and 10, the hinge assembly 250 may also comprise a child-resistant mechanism that prevents small children, from opening the e-liquid dispenser.

FIGS. 17 and 18 show that one embodiment of the child-resistant mechanism may comprise a movable latch 252 that slides into channel 258, where spring 254 exerts a bias on the movable latch 252. When the lid 204 is closed, movable latch 252 may automatically snap or spring back into the "locked" position without any action by the user. Thereafter, the lid 204 preferably cannot be opened until the movable latch 252 is pushed directionally (inwards, downwards or upwards depending on the specific configuration), thus preventing a small child from unintentionally or easily opening the e-liquid dispenser.

Figure 19:
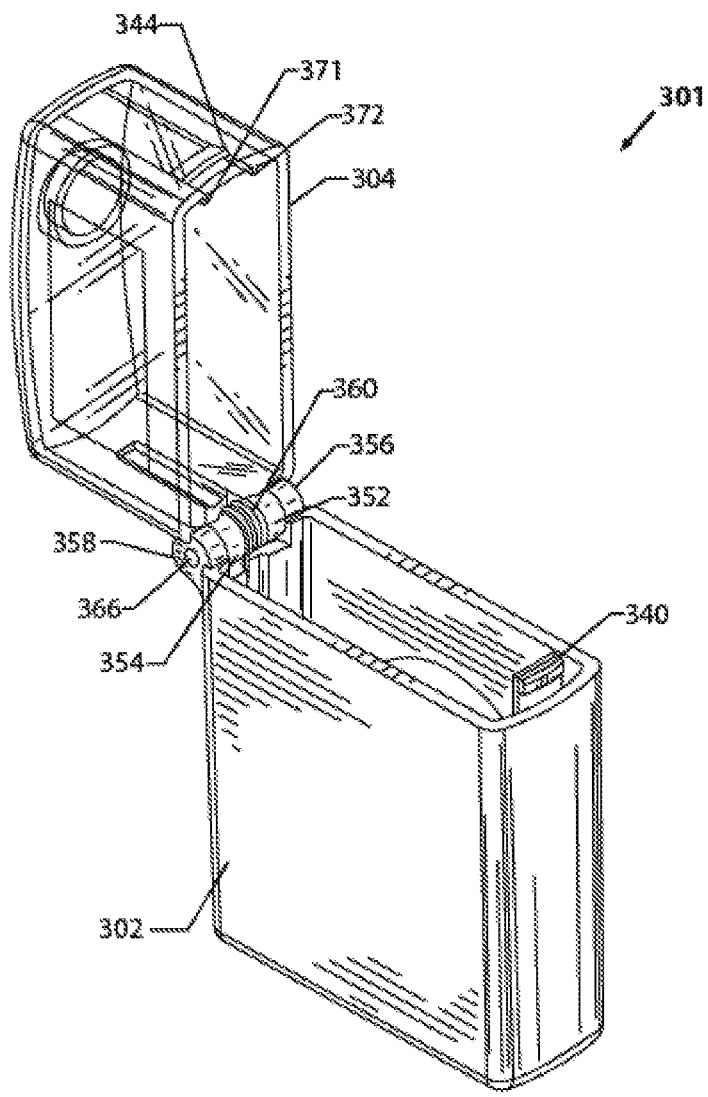
FIG. 19 shows a top perspective view of a third embodiment of the hinged container with a child resistant mechanism.
Figure 20:
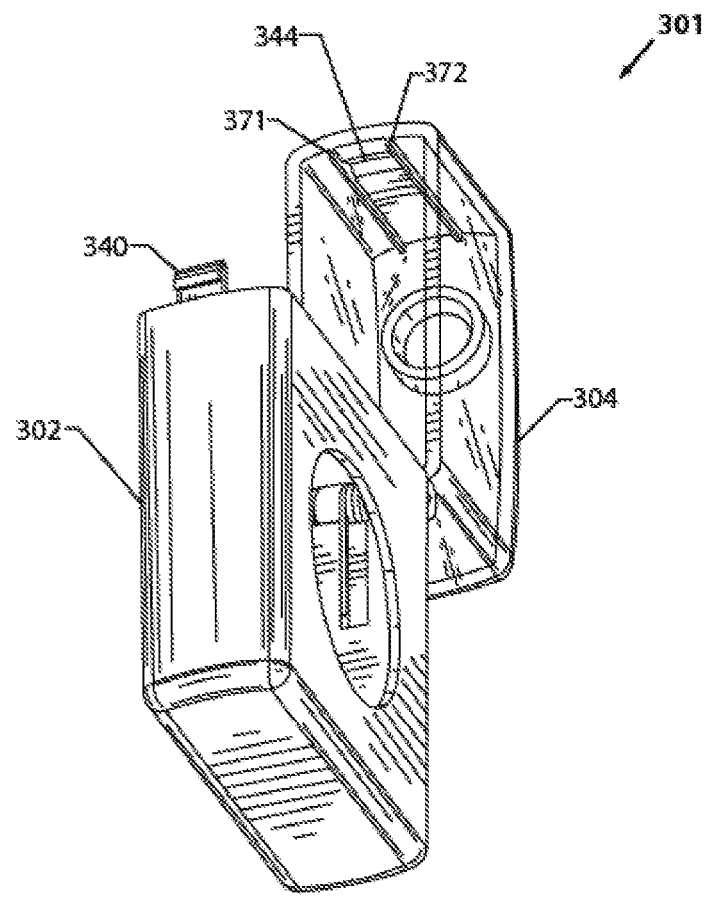
FIG. 20 shows a rear perspective view of the third embodiment of the hinged container with a child resistant mechanism.

FIGS. 19 and 20 show perspective views of a third embodiment of the hinged container with a child resistant mechanism. As shown in FIGS. 19 and 20, a third embodiment of the hinged container 301 may comprise a lid 304, a bottom housing 302, a roll pin 366, and a torsion spring 360.

The lid 304 may comprise: lid hinge barrels, in this case first lid hinge barrel 352 and second lid hinge barrel 354, indentation 344, and ribs 371, 372. The bottom housing 302 may comprise: housing hinge barrels, in this case first housing hinge barrel 356 and second housing hinge barrel 358, and a latch 340.

FIGS. 19 and 20 show that the latch 340 may be positioned above the first sidewall (latch side) of the bottom housing 302 and that the indentation 344 may be located within the first sidewall of the lid 304. The positions of the latch 340 and indentation 344 in conjunction with the openings of the lid hinge barrels (shown in FIG. 21) may serve as the primary components of the child resistant mechanism. In particular, in this embodiment, the openings of first lid hinge barrel 352 and second lid hinge barrel 354 are preferably: (1) oblong, elliptical, or oval and (2) have the length or major axis of the openings substantially aligned with the horizontal plane, such that the wider lengthwise portion of the openings are disposed horizontally. On the other hand, the openings of the housing hinge barrels are preferably circular or round and just large enough to fit the roll pin 366. This allows a user to shift the lid 304 a small distance (e.g., one to several millimeters) leftwards (i.e., away from the hinged assembly) and/or rightwards (i.e., towards the hinged assembly) along a horizontal plane with respect to the bottom housing 302. Thus, when the hinged container 301 is closed, the latch 340 is preferably engaged with the indentation 344, which prevents the user from opening the hinged container 301 by simply pivoting the lid 304 upwards and rightwards. The spring 360 also preferably provides pressure that, when combined with friction, keeps the lid 304 in a closed position. Rather, the child resistant mechanism requires that the user horizontally shift the lid 304 leftward (i.e., away from the hinged assembly) so that the latch 340 is no longer substantially engaged with the indentation 344 or notch. As soon as the latch 340 is no longer substantially engaged with and/or blocked by the indentation 344, the user may then pivot the lid 304 upwards and rightwards, thereby opening the hinged container. Ribs 371, 372 may also be utilized to help guide the latch 340 into the indentation 344. The ribs 371, 372 may also be adapted to prevent the user from twisting the lid 304 with respect to the bottom housing 302.

Figure 21:
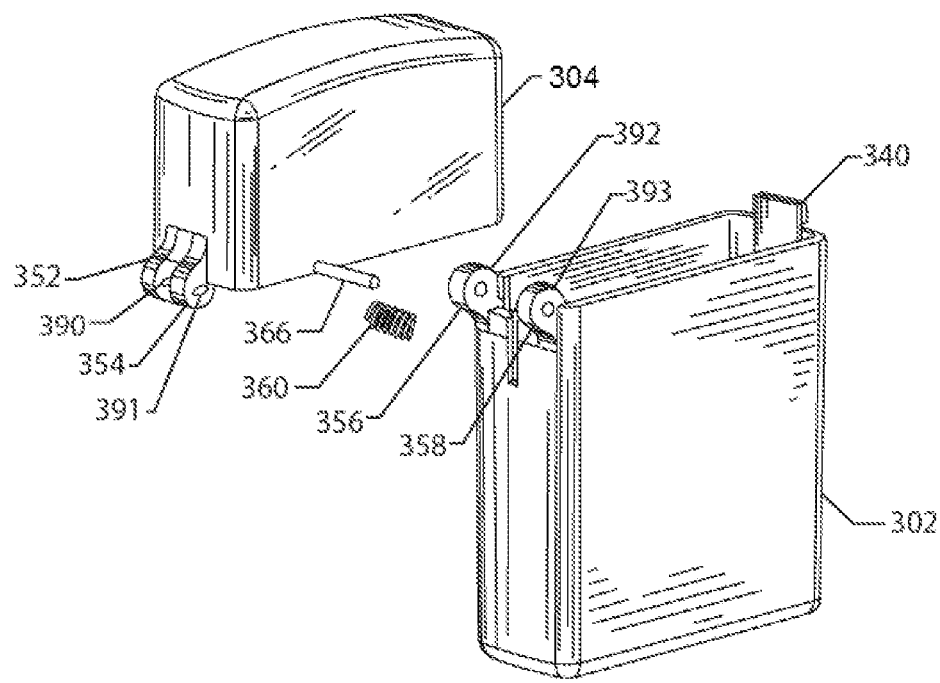
FIG. 21 shows a front exploded perspective view of the third embodiment of the hinged container with a child resistant mechanism.

FIG. 21 shows a front exploded view of the third embodiment of the hinged container with a child resistant mechanism. As shown in FIG. 21, a third embodiment of the hinged container 301 may comprise a lid 304, a bottom housing 302, a roll pin 366, and a torsion spring 360. The lid 304 may comprise: first lid hinge barrel 352 and second lid hinge barrel 354. The bottom housing 302 may comprise: first housing hinge barrel 356, second housing hinge barrel 358, and latch 340. FIG. 21 shows that the openings 390, 391 of the lid hinge barrels of the lid 304 are oblong, oval, or elliptical, whereas the openings of the housing hinge barrels of the bottom housing 302 are circular. This oblong, oval, or elliptical shape of the openings 390, 391 preferably allows a user to move, shift, or "slide" the lid 340 left or right with respect to the hinged assembly, as constrained by the pin 366 as it moves with the oblong openings 390, 391 of the inner hinge barrels 352, 354. This movement, in turn, may release the latch 340 from being engaged with the indentation 344 of the lid 304. As a result, the user may be able to pivot open the lid 304 away from the bottom housing 302.

Figure 22A:
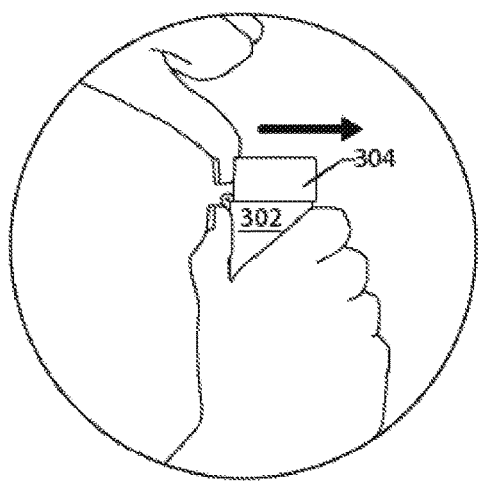
FIGS. 22A and 22B show how a user may be able to open the third embodiment of the hinged container.
Figure 22B:
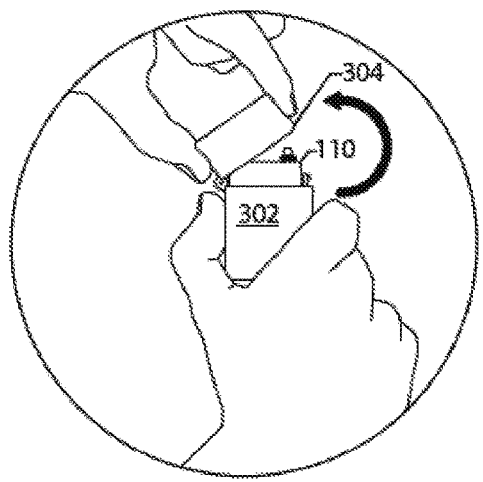

FIGS. 22A and 22B show how a user may be able to open the third embodiment of the hinged container. As shown in FIG. 22A, the user may initially shift, move, or slide the lid 304 to the left (i.e., away from the hinged assembly) with respect to the bottom housing 302. This is preferably due to the oblong, elliptical, or oval shape of the openings 390, 391 of the lid hinge barrels of the lid 304. As a result, the latch 340 is released or disengaged from the indentation 344 of the lid 304. Once the lid 304 is shifted away from the hinged assembly, and the latch 340 released, the user may then pivot open the lid 304 away from the bottom housing 302 to access the e-bottle 100 or other contents.

Although the third embodiment shown in FIGS. 19-22 show the latch 340 positioned at the left sidewall of the bottom housing 302 of the hinged container 301 and the indentation 344 positioned within the interior of the left sidewall of the hinged container 301, it is contemplated that the inverse may also be used in a separate embodiment. In various embodiments the latch may be on the front or rear sidewalls, and/or the sidewall opposite the hinged assembly, as shown in FIGS. 19-22. As shown in FIGS. 16-18, the latch and indentation may be positioned on the same sidewall as the lid.

Figure 23:
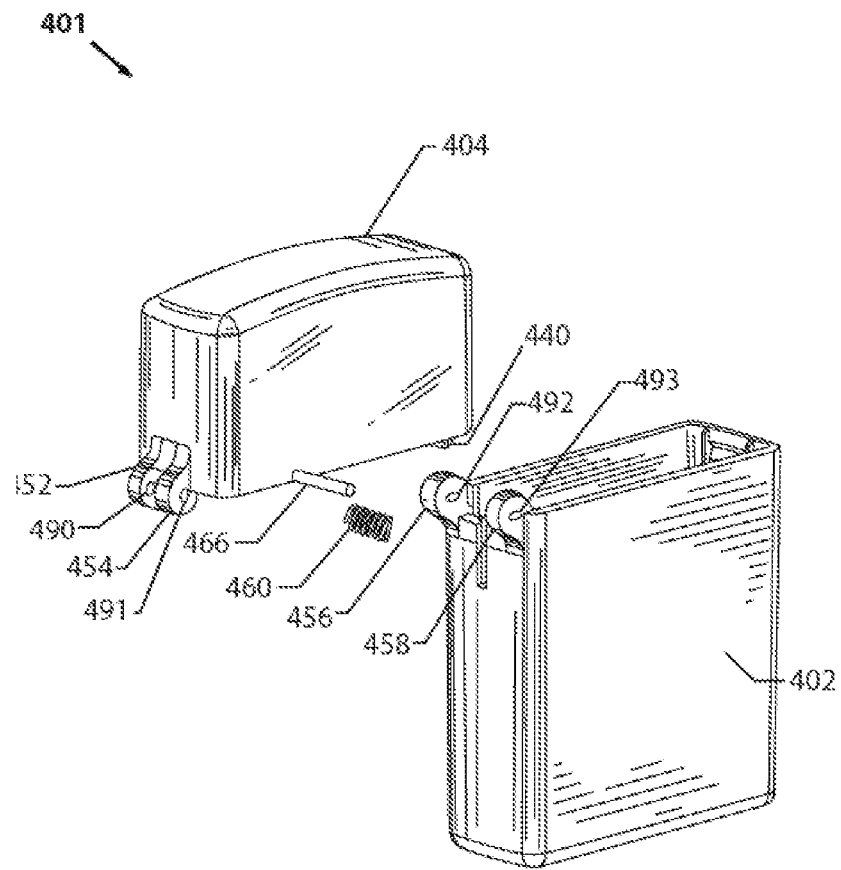
FIG. 23 shows a front exploded perspective view of a fourth embodiment of the hinged container with a child resistant mechanism.

FIG. 23 shows a front exploded view of a fourth embodiment of the hinged container with a child resistant mechanism. As shown in FIG. 23, a fourth embodiment of the hinged container 401 may comprise a lid 404, a bottom housing 402, a roll pin 466, and a torsion spring 460. The lid 404 may comprise: lid hinge barrels (i.e., first lid hinge barrel 452, second lid hinge barrel 454), and a latch 440. The bottom housing 402 may comprise: housing hinge barrels (e.g., first housing hinge barrel 456, second housing hinge barrel 458) and an indentation. Importantly, FIG. 21 shows that the openings 490, 491 of the lid hinge barrels (i.e., first lid hinge barrel 452, second lid hinge barrel 454) of the lid 404 are circular, whereas the openings 492, 493 of the second hinge barrels (i.e., first housing hinge barrel 456, second housing hinge barrel 458) of the bottom housing 402 are oblong, oval, or elliptical. This oblong, oval, or elliptical shape of the second hinge barrels preferably allows a user to move, shift, or "slide" the bottom housing 402 forward or away from the hinged assembly, which in turn, releases the latch 440 from being engaged with the indentation of the lid 404. As a result, the user may be able to pivot open the lid 404 away from the bottom housing 402.

While the above embodiments are directed to a hinged container 100, 101, 200, 301, 401, the child resistant mechanism disclosed herein may be applied to other containers with the various types of hinges, including without limitation, barrel, concealed, butterfly, piano, strap, H, HL, Tee, Friction, living, self-closing, double action, spring, and flush.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of the present disclosure. Accordingly, the detailed description is to be regarded as illustrative in nature and not restrictive. Also, although not explicitly recited, the one or more embodiments may be practiced in combination or conjunction with one another.

Furthermore, the reference or non-reference to a particular embodiment shall not be interpreted to limit the scope of the disclosure. It is intended that the scope of the disclosure not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

We claim:

1. An e-liquid dispenser with a child resistant mechanism, comprising:
a bottom housing;
a lid;
a hinge assembly pivotally coupling said lid to said bottom housing, comprising:
one or more housing hinge barrels;
one or more lid hinge barrels; and
a roll pin;
a child resistant mechanism; and
an e-bottle;
wherein said lid is adapted to pivotally close with said bottom housing, such that said e-liquid dispenser has a closed configuration;
wherein said child resistant mechanism is adapted to keep said e-liquid dispenser in said closed configuration and comprises a latch and an indentation;
wherein said latch and said at least one indentation are disposed opposite one another on said bottom housing and said lid, such that when said e-liquid dispenser is in said closed configuration, said latch and said indentation are releaseably coupled together;
wherein said bottom housing comprises: a front wall, a rear wall, a first sidewall, a second sidewall, and an opening;
wherein said first sidewall of said bottom housing comprises said latch;
wherein said lid comprises a first sidewall and a second sidewall;
wherein said first sidewall of said lid comprises said indentation;
wherein said second sidewall of said lid is pivotally coupled to said second sidewall of said bottom housing;
wherein when said e-liquid dispenser is closed, said latch of said bottom housing matingly engages with said indentation of said lid;
wherein said e-bottle is adapted to removeably fit within an interior of said bottom housing;
wherein a rear wall of said e-bottle comprises a raised portion that fits snugly within said opening located at said rear wall of said bottom housing;
wherein said one or more lid hinge barrels are located at a bottom edge of said second sidewall of said lid and comprise one or more lid hinge barrel openings;
wherein said one or more housing hinge barrels are located at an upper edge of said second sidewall of said bottom housing and comprise one or more housing hinge barrel openings;
wherein said one or more lid hinge barrel openings are substantially oblong in shape; and
wherein said roll pin is disposed between said one or more lid hinge barrel openings and said one or more housing hinge barrel openings, such that said lid is pivotally and slideably coupled to said bottom housing.

2. An e-liquid dispenser with a child resistant mechanism, comprising:
a bottom housing;
a lid;
a child resistant mechanism; and
an e-bottle;
wherein said lid is adapted to pivotally close with said bottom housing, such that said e-liquid dispenser has a closed configuration;
wherein said child resistant mechanism is adapted to keep said e-liquid dispenser in said closed configuration and comprises a latch and an indentation;
wherein said latch and said at least one indentation are disposed opposite one another on said bottom housing and said lid, such that when said e-liquid dispenser is in said closed configuration, said latch and said indentation are releaseably coupled together;
wherein said bottom housing comprises: a front wall, a rear wall, a first sidewall, a second sidewall, and an opening;
wherein said first sidewall of said bottom housing comprises said latch;
wherein said lid comprises a first sidewall and a second sidewall;
wherein said first sidewall of said lid comprises said indentation;
wherein said second sidewall of said lid is pivotally coupled to said second sidewall of said bottom housing;
wherein when said e-liquid dispenser is closed, said latch of said bottom housing matingly engages with said indentation of said lid;
wherein said e-bottle is adapted to removeably fit within an interior of said bottom housing;
wherein a rear wall of said e-bottle comprises a raised portion that fits snugly within said opening located at said rear wall of said bottom housing;
wherein said lid comprises at least two ribbed portions located within said interior of said first sidewall; and
wherein said indentation is disposed between said at least two ribbed portions, such that said at least two ribbed portions are adapted to guide said latch into said indentation.

3. The e-liquid dispenser of claim 1, where said raised portion of said e-bottle is substantially circular in shape having a first diameter;
wherein said opening of said rear wall of said bottom housing is also substantially circular in shape having a second diameter; and
wherein said first diameter is approximately equal to said second diameter, such that said raised portion of said e-bottle snugly fits with said opening of said rear wall of said bottom housing.

4. The e-liquid dispenser of claim 1, wherein said hinge assembly further comprises a torsion spring adapted for exerting a bias between said lid and said bottom housing.

5. The e-liquid dispenser of claim 1, where said e-bottle comprises a spout adapted to dispense said e-liquid from said e-bottle and receive said e-liquid for filling said e-bottle.

6. An e-liquid dispenser with a child resistant mechanism, comprising:
a bottom housing;
a lid;
a hinge assembly pivotally coupling said lid to said bottom housing, comprising:
one or more housing hinge barrels;
one or more lid hinge barrels; and
a roll pin;
a child resistant mechanism; and
an e-bottle;

wherein said lid is adapted to pivotally close with said bottom housing, such that said e-liquid dispenser has a closed configuration;

wherein said child resistant mechanism is adapted to keep said e-liquid dispenser in said closed configuration and comprises a latch and an indentation;

wherein said at least one latch and said at least one indentation are disposed opposite one another on said bottom housing and said lid, such that when said e-liquid dispenser is in said closed configuration, said latch and said indentation are releaseably coupled together;

wherein said bottom housing comprises: a front wall, a rear wall, a first sidewall, a second sidewall, and an opening;

wherein said first sidewall of said bottom housing comprises said indentation;

wherein said lid comprises a first sidewall and a second sidewall;

wherein said first sidewall of said lid comprises said latch;

wherein said second sidewall of said lid is pivotally coupled to said second sidewall of said bottom housing;

wherein when said e-liquid dispenser is closed, said indentation of said bottom housing matingly engages with said latch of said lid;

wherein said e-bottle is adapted to removeably fit within an interior of said bottom housing;

wherein a rear wall of said e-bottle comprises a raised portion that fits snugly within said opening located at said rear wall of said bottom housing;

wherein said one or more lid hinge barrels are located at a bottom edge of said second sidewall of said lid and comprise one or more lid hinge barrel openings;

wherein said one or more housing hinge barrels are located at an upper edge of said second sidewall of said bottom housing and comprise one or more housing hinge barrel openings;

wherein said one or more housing hinge barrel openings are substantially oblong in shape; and wherein said roll pin is disposed between said one or more lid hinge barrel openings and said one or more housing hinge barrel openings, such that said bottom housing is pivotally and slideably coupled to said lid.

7. An e-liquid dispenser with a child resistant mechanism, comprising:

a bottom housing;
a lid;
a child resistant mechanism; and
an e-bottle;

wherein said lid is adapted to pivotally close with said bottom housing, such that said e-liquid dispenser has a closed configuration;

wherein said child resistant mechanism is adapted to keep said e-liquid dispenser in said closed configuration and comprises a latch and an indentation;

wherein said at least one latch and said at least one indentation are disposed opposite one another on said bottom housing and said lid, such that when said e-liquid dispenser is in said closed configuration, said latch and said indentation are releaseably coupled together;

wherein said bottom housing comprises: a front wall, a rear wall, a first sidewall, a second sidewall, and an opening;

wherein said first sidewall of said bottom housing comprises said indentation;

wherein said lid comprises a first sidewall and a second sidewall;

wherein said first sidewall of said lid comprises said latch;

wherein said second sidewall of said lid is pivotally coupled to said second sidewall of said bottom housing;

wherein when said e-liquid dispenser is closed, said indentation of said bottom housing matingly engages with said latch of said lid;

wherein said e-bottle is adapted to removeably fit within an interior of said bottom housing;

wherein a rear wall of said e-bottle comprises a raised portion that fits snugly within said opening located at said rear wall of said bottom housing;

wherein said bottom housing comprises at least two ribbed portions located within said interior of said first sidewall; and wherein said indentation is disposed between said at least two ribbed portions, such that said at least two ribbed portions are adapted to guide said latch into said indentation.

8. The e-liquid dispenser of claim 6, where said raised portion of said e-bottle is substantially circular in shape having a first diameter;

wherein said opening of said rear wall of said bottom housing is also substantially circular in shape having a second diameter; and wherein said first diameter is approximately equal to said second diameter, such that said raised portion of said e-bottle snugly fits with said opening of said rear wall of said bottom housing.

9. The e-liquid dispense of claim 6, wherein said hinge assembly further comprises a torsion spring adapted for exerting a bias between said lid and said bottom housing.

10. The e-liquid dispenser of claim 6, where said e-bottle comprises a spout adapted to dispense said e-liquid from said e-bottle and receive said e-liquid for filling said e-bottle.

11. The e-liquid dispenser of claim 2, where said raised portion of said e-bottle is substantially circular in shape having a first diameter;

wherein said opening of said rear wall of said bottom housing is also substantially circular in shape having a second diameter; and wherein said first diameter is approximately equal to said second diameter, such that said raised portion of said e-bottle snugly fits with said opening of said rear wall of said bottom housing.

12. The e-liquid dispenser of claim 2, where said e-bottle comprises a spout adapted to dispense said e-liquid from said e-bottle and receive said e-liquid for filling said e-bottle.

13. The e-liquid dispenser of claim 7, where said raised portion of said e-bottle is substantially circular in shape having a first diameter;

wherein said opening of said rear wall of said bottom housing is also substantially circular in shape having a second diameter; and wherein said first diameter is approximately equal to said second diameter, such that said raised portion of said e-bottle snugly fits with said opening of said rear wall of said bottom housing.

14. The e-liquid dispenser of claim 7, where said e-bottle comprises a spout adapted to dispense said e-liquid from said e-bottle and receive said e-liquid for filling said e-bottle.

* * * * *